United States Patent [19]
Patzelt et al.

[11] Patent Number: 5,735,631
[45] Date of Patent: Apr. 7, 1998

[54] JOINT FOR THE SWIVEL BEARING OF A CASING TUBE OF AN INCLINATION-ADJUSTABLE STEERING COLUMN ON A CASING TUBE SUSPENSION

[75] Inventors: Helmut Patzelt, Kernen; Manfred Link, Waiblingen, both of Germany

[73] Assignee: Mercedes-Benz AG, Germany

[21] Appl. No.: 689,344

[22] Filed: Aug. 8, 1996

[30] Foreign Application Priority Data

Aug. 25, 1995 [DE] Germany ............ 195 31 278.3

[51] Int. Cl.$^6$ ............ B62D 1/16; F16C 9/04
[52] U.S. Cl. ............ 403/378; 403/371; 403/334; 403/71; 280/775
[58] Field of Search ............ 403/334, 380, 403/378, 371, 68, 71, 79; 280/775, 779; 74/493

[56] References Cited

U.S. PATENT DOCUMENTS

| | | | |
|---|---|---|---|
| 1,251,965 | 1/1918 | Coatalen | 403/79 X |
| 4,191,488 | 3/1980 | Bickerton | 403/371 X |
| 4,240,305 | 12/1980 | Denaldi et al. | 74/493 |
| 4,713,861 | 12/1987 | Bancroft | |
| 4,886,391 | 12/1989 | Ragsdale, Sr. | 403/371 X |
| 4,925,210 | 5/1990 | Peitsmeier et al. | 280/775 |
| 5,105,677 | 4/1992 | Hoblingre et al. | 280/775 X |

FOREIGN PATENT DOCUMENTS

| | | |
|---|---|---|
| 0408847A1 | 1/1991 | European Pat. Off. . |
| 0572771A1 | 12/1993 | European Pat. Off. . |
| 3737225C1 | 1/1989 | Germany . |
| 0243528 | 12/1925 | United Kingdom . |

*Primary Examiner*—Anthony Knight
*Attorney, Agent, or Firm*—Evenson, McKeown, Edwards & Lenahan, P.L.L.C.

[57] ABSTRACT

A joint is disclosed for the swivel bearing of a casing tube of an inclination-adjustable steering column on a casing tube suspension, having a joint head which is held between laterally surrounding fork legs, coaxial passage bores in the surrounding fork legs from which a longitudinal section of a bearing axle projects into an opposite fitted seat of the joint head, and two bearing bushes which surround the projecting longitudinal section of their bearing axle and which are conically constructed on their outer circumference and engage in their associated, fittingly conical fitted seat. An axial loading of the bearing bushes tapering toward one another is by way of a screwed advance of their bearing axle by means of which the bearing bushes are pressed without play into their fitted seat. In order to permit a lower-cost manufacturing of the joint, both fitted seats of the joint head are arranged in the end area of a cylindrical bore which is widened by means of a chamfer to form a fitted seat, and the bearing bushes have a basic cylindrical shape and engage by means of a conically slanted end area into the assigned fitted seat of their bore, their end area being constructed to be radially flexible.

9 Claims, 1 Drawing Sheet

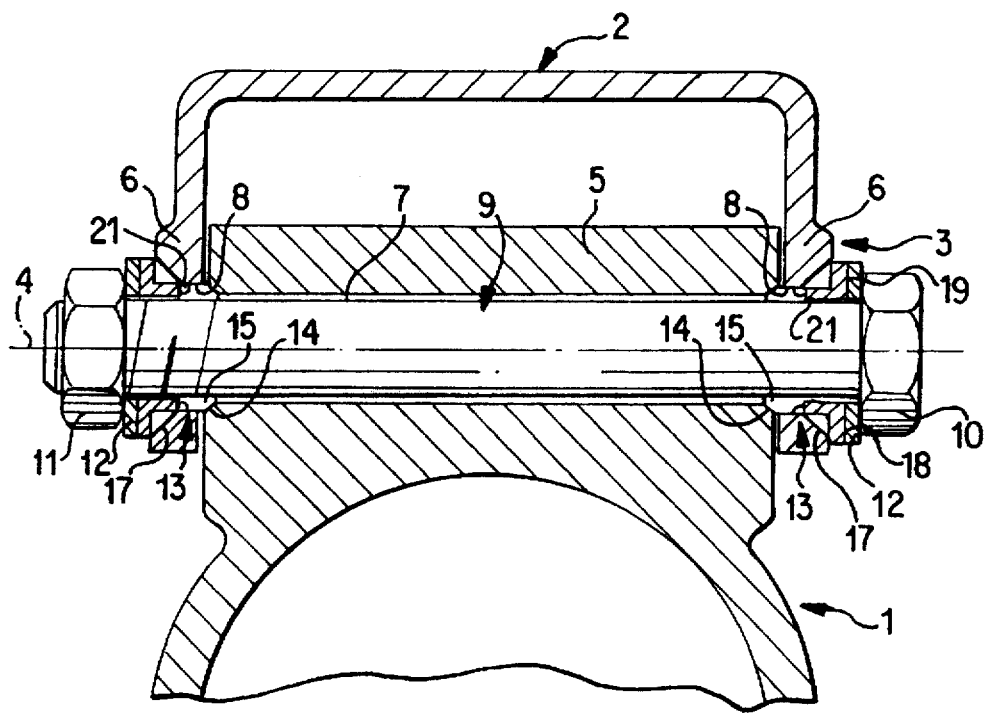
FIG. 1
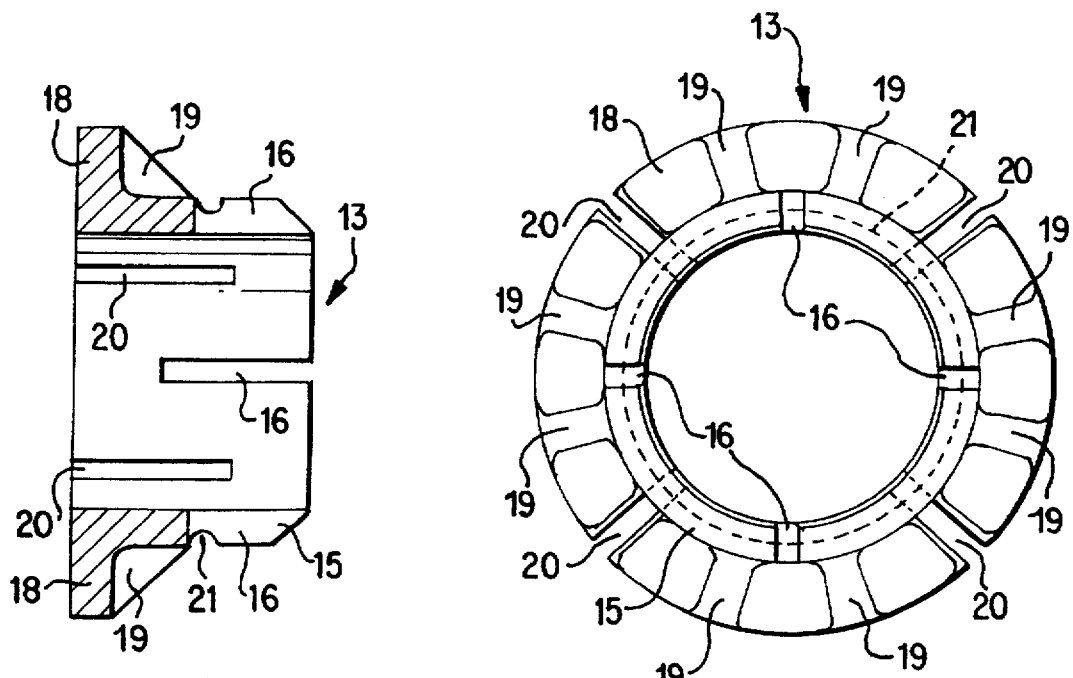
FIG. 2
FIG. 3

5,735,631

JOINT FOR THE SWIVEL BEARING OF A CASING TUBE OF AN INCLINATION-ADJUSTABLE STEERING COLUMN ON A CASING TUBE SUSPENSION

BACKGROUND AND SUMMARY OF THE INVENTION

This invention relates to a joint for the swivel bearing of a casing tube of an inclination-adjustable steering column on a casing tube suspension. Certain preferred embodiments relate to a joint of the type having a joint head which is held between laterally surrounding fork legs, having coaxial passage bores in the surrounding fork legs from which a longitudinal section of a bearing axle projects into an opposite fitted seat of the joint head, having two bearing bushes which surround the projecting longitudinal section of their bearing axle and which are conically constructed on their outer circumference and engage in their associated, fittingly conical fitted seat and having an axial load of the bearing bushes tapering toward one another by way of a screwed advance of their bearing axle by means of which the bearing bushes are pressed without play into their fitted seat.

A joint of this type is known, for example, from German Patent Document DE 37 37 225 C1. The known joint has two short axle stubs which are screwably guided in coaxial threaded bores of the fork legs. By means of a conical shaft, they project into a pertaining fitted seat in the joint head which is constructed to be conically in parallel thereto along the whole working length of the shaft. A bearing bush in the form of a taper sleeve is in each case disposed between the external cone of the shaft and the internal cone of the fitted seat. By means of the rotation of the axle stubs in their threaded bore, the axle stubs can be displaced in the taper direction of their fitted seat, whereby a play-free bearing of the joint head between the fork legs can be achieved. Since the interacting joint parts must be manufactured to be very true to size, the manufacturing of the joint is correspondingly expensive.

It is an object of the invention to further develop a joint of the above-mentioned type in that the joint can be produced at lower cost without any losses with respect to its technical function.

According to the invention, this object is achieved by providing an arrangement wherein both fitted seats of the joint head are arranged in the end area of a cylindrical bore which is widened by means of a chamfer to form a fitted seat, and in that the bearing bushes have a basic cylindrical shape and engage by means of a conically slanted end area in the assigned fitted seat of their bore, their end area being constructed to be radially flexible.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional view of a lower joint of a casing tube of an inclination-adjustable steering column constructed according to a preferred embodiment of the invention;

FIG. 2 is a longitudinal sectional view of a bearing bush of the joint of FIG. 1; and FIG. 3 is a frontal view of the bearing bush of FIG. 2.

DETAILED DESCRIPTION OF THE DRAWINGS

A casing tube 1 of a safety steering column is suspended in its lower area on a strut 2 which is rigidly connected with a cross member of the vehicle body which is not shown. For the suspension, a joint 3 is used, whereby the casing tube 1 is disposed about a stationary geometrical swivel axis 4 which extends essentially horizontally in the lateral direction of the pertaining motor vehicle.

In order to permit, by means of swivelling the casing tube 1 about the swivel axis 4, an adjustment of the inclination of the casing tube 1 and thus a corresponding height adjustment of the steering wheel, the casing tube 1 is suspended on a body-fixed strut so that it can be displaced in the upper not-shown longitudinal area into the longitudinal direction of the motor vehicle. Manually or motor driven adjusting devices of the known type provided for adjusting the inclination.

For the construction of the joint 3, the casing tube 1 has a joint head 5 on the forward circumferential side which joint head 5 is cast in one piece with the casing tube 1. The fork legs 6 of the strut 2 reach laterally around the joint head 5. On the whole, the strut 2 has a U-shaped cross-section, and the joint head 5 has a passage bore 7. Opposite the ends of the passage bore 7, the fork legs 6 are each penetrated by a passage bore 8 which, in comparison to the passage bore 7, has a larger diameter. A cylindrical shaft of a through-screw 9, whose shaft diameter is slightly smaller than the diameter of the passage bore 7 in the joint head 5, extends through the passage bores 7 and 8. In its end area opposite the screw head 10, the through-screw 9 is provided with a thread on which a fitting screw nut 11 moves. One washer 12 respectively is placed under the screw head 10 and the screw nut 11 in order to enlarge their axial support surface. By way of their washer 12, the screw head 10 and the screw nut 11 are axially supported on the front side of an assigned bearing bush 13 which has a hollow-cylindrical basic shape and surrounds the shaft of the through-screw 9 on a partial length exceeding the length of the pertaining passage bore 8.

In order to achieve a play-free bearing of the joint head 5 on the shaft of the through-screw 9 in a technically simple manner, the opposite end areas of the passage bore 7 are each widened by a chamfer 14 whereby oppositely conical fitted seats are generated. An end area 15 of the assigned bearing bush 13 engages in the annulus between the chamfer 14 and the screw shaft, which end area is conically chamfered in parallel to the corresponding chamfer 14. As illustrated in connection with the individual representation of the bearing bush 13, four longitudinal slots 16 are recessed out of the bearing bush 13 which are arranged along its circumference in a uniformly distributed manner and which extend in parallel to the longitudinal axis from the front side to beyond the longitudinal center of the bearing bush 13. As a result, a radially elastic flexibility of the end area 15 of the bearing bush 13 is achieved which, on the whole, is injection-molded of plastic. When the mirror-symmetrically arranged bearing bushes 13 of the joint 3 are now axially loaded by the tightening of the screwed-on screw nut 11, they are pushed deeper into the common passage bore 7 of the joint head 5 in the sense of a shortening of the distance. In this case, their chamfered end area 15 is displaced increasingly radially by the cone of the chamfer 14 until it surrounds the shaft of the through-screw 9 without play. Because of the radial elasticity of the end areas 15, existing manufacturing tolerances are automatically compensated.

So that the shaft of the through-screw 9 is additionally held free of play in the passage bores 8 of the fork legs 6 which it penetrates, the passage bores 8 are conically widened in their end area facing the screw head 10 or the screw nut 11 by means of a chamfer 17, and an end area of the pertaining bearing bush 13 which is thickened in a wedge shape is pressed into the fitted ring seat bounded by the chamfer 17. The thickened end area ends with a collar 18 which projects radially from the end of the bearing bush 13 and by means of which the bearing bush 13 is axially supported on the assigned washer 12. Starting from the diameter of the collar 18, the thickening tapers by means of several molded-on V-ribs 19 to the diameter of the bearing bush 13, the oblique circumferential side of the V-ribs 19 extending in parallel to the chamfer 17. So that also the thickened end area of the bearing bushes 13 is radially more flexible, starting from the collar 18, four longitudinal slots 20 are also recessed out of the bearing bushes 13 and also extend beyond the longitudinal center of the bearing bushes 13. By means of the longitudinal overlapping of the longitudinal slots 16 and 20 cut in or sunk in from the opposite ends of the bearing bushes 13, a radial flexibility of the bearing bushes 13 is obtained along their whole length, which further improves their suitability for compensating tolerances. Since the longitudinal slots 16 and 20 start alternately from opposite ends of the bearing bushes 13, a radially uniform flexibility is maintained.

In order to be able to exercise, during the screwed bracing of the bearing bushes 13, advancing forces of the slanted end area 15 onto the chamfer 14 and of the V-ribs 19 onto the chamfer 17 which are as uniform as possible, the cross-section of the bearing bushes 13 is in each case weakened in the center area by means of a ring groove 21. In the case of a correspondingly unfavorable position of the manufacturing tolerances, the length of the bearing bushes 13 is therefore slightly shortened during their axial screwed bracing because they can be slightly compressed on the ring groove 21.

Preferably, the chamfers 14 and 17 as well as the slants of the end areas 15 and the slanted surfaces of the V-ribs 19 extend at an angle of approximately 45° with respect to the geometrical swivel axis 4.

Despite the freedom from play, the joint 3 is therefore particularly smooth moving so that an adjustment of the inclination of the casing tube 1 can be carried out with low expenditures of force.

The described joint 3 can not only be manufactured at low cost but also be mounted rapidly and without any problems.

If permitted by the constructive edge conditions, it can therefore advantageously be used also for joints of the upper casing tube suspension which are not shown here.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Joint for the swivel bearing of a casing tube of an inclination-adjustable steering column on a casing tube suspension, comprising a joint head which is held between laterally surrounding fork legs, coaxial passage bores in the surrounding fork legs from which a longitudinal section of a bearing axle projects into an opposite fitted seat of the joint head, two bearing bushes which surround the projecting longitudinal section of their bearing axle and which are conically constructed on their outer circumference and engage in associated, fittingly conical fitted seat and having an axial load of the bearing bushes tapering toward one another by way of a screwed advance of their bearing axle such that the bearing bushes are pressed without play into their associated fitted seat, wherein both fitted seats of the joint head are arranged in the end area of a cylindrical bore which is widened by a chamfer to form a fitted seat, and the bearing bushes have a basic cylindrical shape and a conically slanted end area for engagement thereof in the associated fitted seat, with end area thereof being constructed to be radially flexible.

2. Joint according to claim 1, wherein both bearing bushes are penetrated by a common bearing axle which is formed by a cylindrical shaft of a through-screw, the bearing bushes being axially loadable by the tightening of an assigned screw nut.

3. Joint according to claim 2, wherein the bearing bushes have on their end opposite the slanted end area a radially projecting collar by means of which they are axially supported on the screw nut or on the screw head.

4. Joint according to claim 3, wherein the passage bores of the fork legs are conically widened by means of a chamfer in their end area facing the screw head or the screw nut, and wherein the bearing bushes, starting from the collar, with an adaptation to the slant angle of the chamfer, are tapered in a wedge shape and cause a centering of the bearing bush in the pertaining passage bore.

5. Joint for the swivel bearing of a casing tube of an inclination-adjustable steering column on a casing tube suspension, comprising a joint head which is held between laterally surrounding fork legs, coaxial passage bores in the surrounding fork legs from which a longitudinal section of a bearing axle projects into an opposite fitted seat of the joint head, two bearing bushes which surround the projecting longitudinal section of their bearing axle and which are conically constructed on their outer circumference and engage in associated, fittingly conical fitted seat and having an axial load of the bearing bushes tapering toward one another by way of a screwed advance of their bearing axle such that the bearing bushes are pressed without play into their associated fitted seat, wherein both fitted seats of the joint head are arranged in the end area of a cylindrical bore which is widened by a chamfer to form a fitted seat, and the bearing bushes have a basic cylindrical shape and a conically slanted end area for engagement thereof in the associated fitted seat, with end area thereof being constructed to be radially flexible, both bearing bushes are penetrated by a common bearing axle which is formed by a cylindrical shaft of a through-screw, the bearing bushes being axially loadable by the tightening of an assigned screw nut, the bearing bushes have on their end opposite the slanted end area a radially projecting collar by means of which they are axially supported on the screw nut or on the screw head, wherein the passage bores of the fork legs are conically widened by means of a chamfer in their end area facing the screw head or the screw nut, and wherein the bearing bushes, starting from the collar, with an adaptation to the slant angle of the chamfer, are tapered in a wedge shade and cause a centering of the bearing bush in the pertaining passage bore, wherein the wedge-shaped tapering of the bearing bushes is produced by several V-ribs 19 arranged in a distributed manner along the circumference of its bearing bush.

6. Joint according to claim 1, wherein the bearing bushes consist of a bending elastic bearing material and are weakened with respect to their bending in their radially flexible end area by longitudinal slots arranged in a distributed manner along their circumference.

7. Joint according to claim 6, wherein in each case, the bearing bushes are weakened in their two end areas with respect to bending by means of longitudinal slots, the longitudinal slots being arranged starting alternately from opposite ends of their respective bearing bush.

8. Joint according to claim 1, wherein the bearing bushes have a longitudinal section which is weakened in its cross-section and at which their lengths can be shortened when they are axially loaded.

9. Joint according to claim 1, wherein the bearing bushes are each constructed as a plastic part which is injection-molded in one piece.

* * * * *